United States Patent [19]
Birk et al.

[11] Patent Number: 5,188,081
[45] Date of Patent: Feb. 23, 1993

[54] CONTROL SYSTEM FOR A FUEL PUMP

[75] Inventors: Manfred Birk, Oberriexingen; Gerhard Engel, Stuttgart; Wilhelm Eyberg, Stuttgart; Thomas Henze, Stuttgart; Alfred Schmitt, Ditzingen, all of Fed. Rep. of Germany

[73] Assignee: Robert Bosch GmbH, Stuttgart, Fed. Rep. of Germany

[21] Appl. No.: 808,192

[22] Filed: Dec. 13, 1991

[30] Foreign Application Priority Data

Dec. 20, 1990 [DE] Fed. Rep. of Germany ....... 4040828

[51] Int. Cl.$^5$ .................... F02M 51/00; F02D 31/00
[52] U.S. Cl. .................... 123/479; 123/359; 123/436; 73/119 A
[58] Field of Search ............... 123/435, 436, 479, 357, 123/359, 198 D; 73/119 A

[56] References Cited

U.S. PATENT DOCUMENTS

| | | |
|---|---|---|
| 4,471,739 | 9/1984 | Yamato et al. ................... 123/479 |
| 4,476,830 | 10/1984 | Hasegawa et al. ............. 123/198 D |
| 4,561,397 | 12/1985 | Tsukamoto et al. ............. 123/357 |
| 4,664,082 | 5/1987 | Suzuki ................................ 123/479 |
| 4,766,863 | 8/1988 | Fujimori ............................ 123/357 |
| 4,825,369 | 4/1989 | Oshizawa ........................... 123/357 |
| 4,825,691 | 5/1989 | Sekiguchi .......................... 123/479 |
| 4,846,131 | 7/1989 | Uchinami et al. ................ 123/479 |
| 4,883,038 | 11/1989 | Nakaniwa ........................ 123/436 |
| 4,941,445 | 7/1990 | Deutsch ............................ 123/479 |
| 5,021,960 | 6/1991 | Manaka et al. ................. 123/436 |

Primary Examiner—Tony M. Argenbright
Assistant Examiner—Thomas N. Moulis
Attorney, Agent, or Firm—Kenyon & Kenyon

[57] ABSTRACT

A control system for a fuel pump, particularly for a solenoid-valve-controlled fuel pump in the case of a self-ignitable internal-combustion engine, in which at least one pulse transmitter is mounted on the crankshaft and/or on the camshaft. The generated pulse sequences include at least several reference pulses for establishing the beginning of fuel injection, as well as speed pulses for detecting the average and the instantaneous rotational speeds. A trial activation takes place to detect into which cylinder the fuel must be injected. Based on the reaction of the fuel injection system and/or of the internal-combustion engine, it is detected whether fuel was injected into the proper cylinder.

15 Claims, 7 Drawing Sheets

CONTROL SYSTEM FOR A FUEL PUMP

FIELD OF THE INVENTION

The present invention relates to a control system for a fuel pump, and in particular for a solenoid-valve-controlled fuel pump for an internal-combustion engine.

BACKGROUND INFORMATION

A control system for a fuel pump for a diesel gasoline engine is described in German Published Patent Application No. 40 21 886. Solenoid valves control the supply of fuel. Pulse wheels are located on the crankshaft and/or on the camshaft to precisely control the fuel injection quantity and the start of fuel injection. Each of these pulse wheels emits a sequence of different pulses. A reference pulse mark, which establishes the beginning of fuel injection, is provided for each injection process. Furthermore, speed pulses are provided for determining the average and the instantaneous rotational speed. A synchronization pulse emitted by a pulse wheel on the camshaft serves to assign and inject fuel to the appropriate cylinder. Because this pulse wheel also emits speed pulses for determining the instantaneous rotational speed, the mark which emits the synchronization pulse can result in inaccuracies in determining rotational speed.

An object of the present invention is to obtain the fastest and most precise synchronization of the injection process, without thereby affecting the remaining measuring signals. Synchronization should still be possible when various sensor signals are not available.

SUMMARY OF THE INVENTION

The present invention is directed to a control system for a fuel pump for an internal-combustion engine of a vehicle. The control system includes a pulse transmitter mounted on the crankshaft or camshaft of the vehicle for generating pulses used to detect rotational speed. The pulses are received by a controlling device which determines the quantity of fuel to be injected into the cylinders based on the pulses. The control system also includes means for activating the controlling device to inject fuel into a particular cylinder of the engine and to synchronize fuel injection, as well as means for detecting whether fuel was injected into the proper cylinder based upon the reaction of the engine to the injection of fuel.

Advantages of the control system according to the present invention include that no additional transmitter is required for the synchronization process and that the synchronization process takes place very quickly. Furthermore, errors occurring in detecting rotational speed are minimized because of the synchronous pulse.

The present invention is also directed to a method of the operation of the control system.

DETAILED DESCRIPTION

The system according to the present invention shall be described in conjunction with a diesel or gasoline engine. However, the present invention may also be applied to other internal-combustion engines in which fuel injection is controlled, or regulated.

Figure 1:
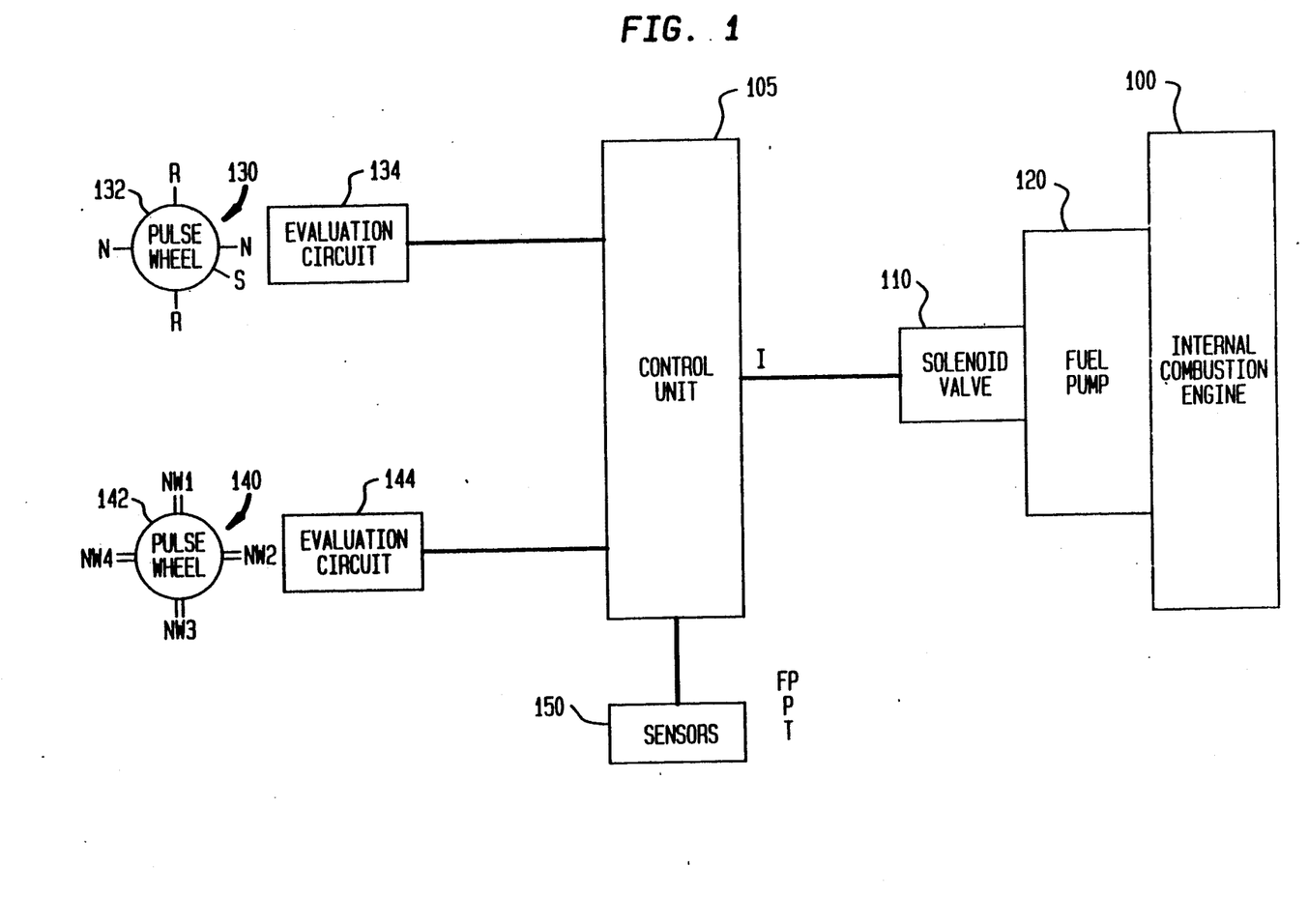
FIG. 1 shows a block diagram of a system according to the present invention.

Referring to FIG. 1, a block diagram of a system according to the present invention is shown. A control unit 105 is connected to a final controlling device 110, and, in particular, a solenoid valve 110. The solenoid valve 110 is located on a fuel pump 120. Depending upon the position of the solenoid valve 110, the fuel pump 120 injects fuel into the internal-combustion engine 100. In the system shown in FIG. 1, each cylinder of the internal-combustion engine 100 has a separate fuel pump 120 and solenoid valve 110. It is also possible, however, for the same fuel pump 120 and solenoid valve 110 to alternately inject fuel into the individual cylinders. This applies particularly to solenoid-valve-controlled distributor pumps.

The control unit 105 receives signals from a pulse transmitter 130 mounted on the crankshaft and from a pulse transmitter 140 mounted on the camshaft. The pulse transmitters 130 and 140 are each comprised of a pulse wheel 132, 142 on the respective shafts and of a sensor together with an evaluation circuit 134, 144, respectively, which emits corresponding pulses. The control unit 105 also receives signals from additional sensors 150, which may indicate the position of the gas pedal, temperature values, pressure values, and/or other driving conditions. Based upon these signals, the control unit 105 calculates the trigger pulses I for the solenoid valve 110.

Preferably, the number of teeth on the pulse wheel on the crankshaft corresponds to the number of cylinders of the internal-combustion engine. There is also a synchronization mark S on pulse wheel 132. Since the camshaft rotates twice for every motor revolution, with every revolution of the motor, the pulse transmitter generates a reference pulse R and a speed pulse N, as well as two synchronization pulses S, for each cylinder. The speed and reference pulses have the same spacing in each case.

On the pulse wheel located on the camshaft, marks NW each generate two pulses per cylinder. Two such pulses define a rotational-speed measuring angle NM and are used to acquire the instantaneous rotational speed. Two rotational-speed measuring marks NW1, NW2, NW3 and NW4 are provided for each cylinder.

In control systems of the prior art, a cylinder counter is provided which continuously counts between the values 1 and N, where N indicates the number of cylinders of the internal-combustion engine. Fuel is injected into the appropriate cylinder dependent upon the counter content. For example, if the cylinder counter contains a 3, then cylinder 3 is the next to be injected. This cylinder counter stipulates the firing order. When the internal-combustion engine is started, synchronization must take place. This means that the counter must be initialized with the correct value. How this synchronization takes place will be delineated in the following explanation.

The system according to the present invention is also applicable, with appropriate modifications, to injection systems in which the pulse transmitters are mounted in reverse. This means that the pulse transmitter that generates the speed pulses is located on the crankshaft, and the pulse transmitter that emits the reference pulses is located on the camshaft. It is even possible for both pulse transmitters to be placed on the same shaft, or for only one pulse transmitter to be provided and for one corresponding evaluation circuit to separate the individual pulse sequences.

Figure 2A:
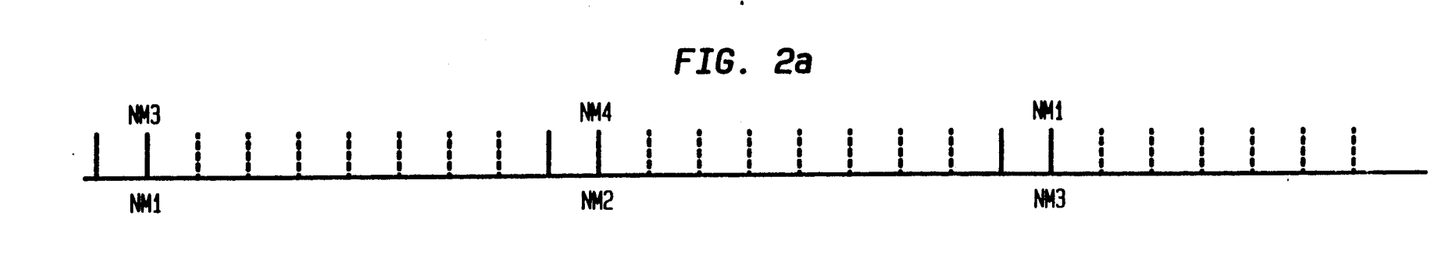
FIGS. 2a, 2b, and 2c show the various pulses from the pulse transmitter mounted on the camshaft and crankshaft, as well as the rotational speed as a function of time.

Referring now to FIG. 2, the various pulses are shown for slightly more than one-half of a motor revolution. The rotational-speed measuring angle NM for acquiring the instantaneous rotational speed of the internal-combustion engine is at FIG. 2a. In each case, two successive pulses are designated as rotational-speed measuring angles NM1, NM2, NM3, NM4. On the basis of these pulses, the instantaneous rotational speed is calculated. This is used to calculate the precise fuel quantity to be injected during the next injection.

Additional pulses are drawn as dotted lines. These pulses are not absolutely necessary, but do provide significant improvements in the system. The pulses are arranged so that all pulses from the pulse transmitter on the camshaft have the same spacing. This is advantageous because it considerably simplifies the signal analysis, in that pulses having the same spacing can be evaluated more easily and accurately than pulses having unequal spacing.

Figure 2B:
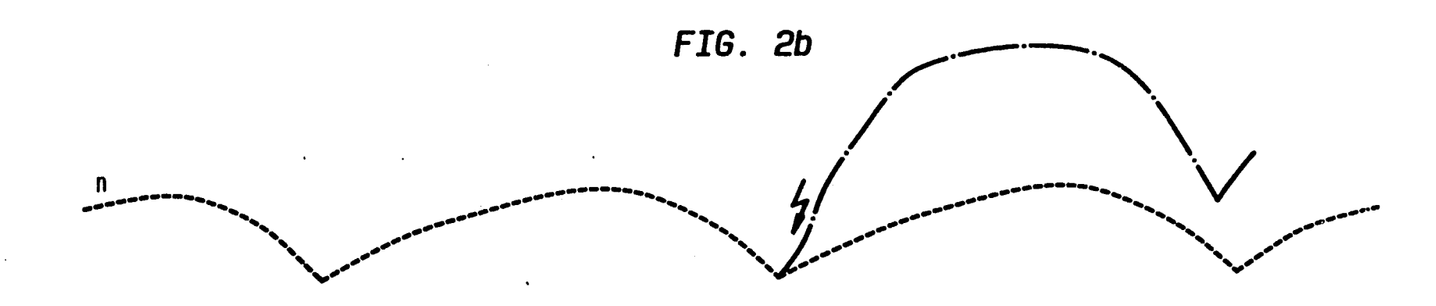

However, only those pulses which are drawn in thickly are necessary to the system according to the present invention. They form the rotational-speed measuring angles designated as NM1, NM2, NM3 and NM4. The rotational speed which results when there is no injection is drawn as a dotted line in FIG. 2b. The rotational speed which results when an injection takes place following the rotational-speed measuring angle NM2 is plotted as a dot-dash line in FIG. 2b.

Figure 2C:
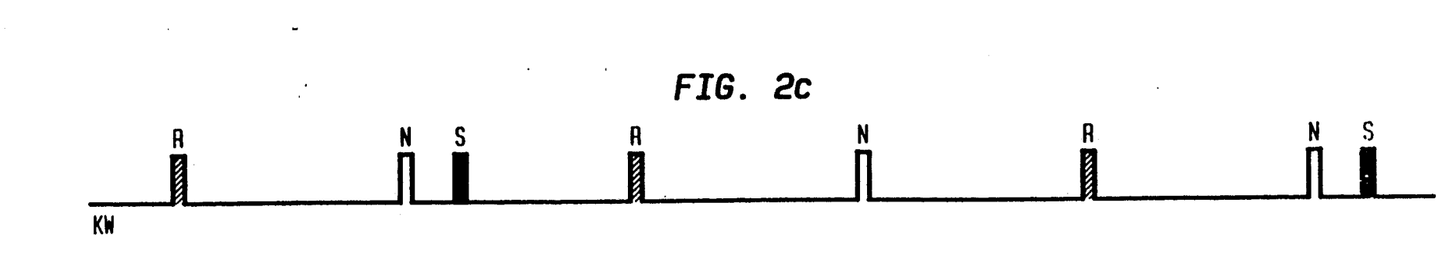

The pulses from the crankshaft transmitter are plotted in FIG. 2c. The reference pulses R immediately follow the rotational-speed measuring angle NM of the corresponding cylinder. A speed pulse N is also drawn in each case between two reference pulses R. This speed pulse N serves to acquire the average rotational speed of the crankshaft. A synchronization pulse S, which is used to synchronize the cylinders, is also drawn.

Since the crankshaft rotates two revolutions per pump revolution, and the camshaft, in comparison, rotates only one revolution per pump revolution, two crankshaft revolutions result per camshaft revolution. This is indicated by designating the rotational-speed measuring angle NM1 as the rotational-speed measuring angle NM3, and the rotational-speed measuring angle NM2 as the rotational-speed measuring angle NM4.

If the control unit 105 detects at this point that the synchronization pulse S has appeared, the instantaneous rotational speed needed to calculate the injection into the second or fourth cylinder is determined from the rotational-speed measuring angle NM2. After the synchronization mark appears, the next injection must follow, either into cylinder 2 or 4. An injection into cylinder 2 follows. If the pattern indicated by a dot-dash line drawn in FIG. 2b results, then this injection was correct. If, on the other hand, the pattern indicated by a dotted line results, then cylinder 2 was wrong, and the injection should have taken place into cylinder 4.

Figure 3:
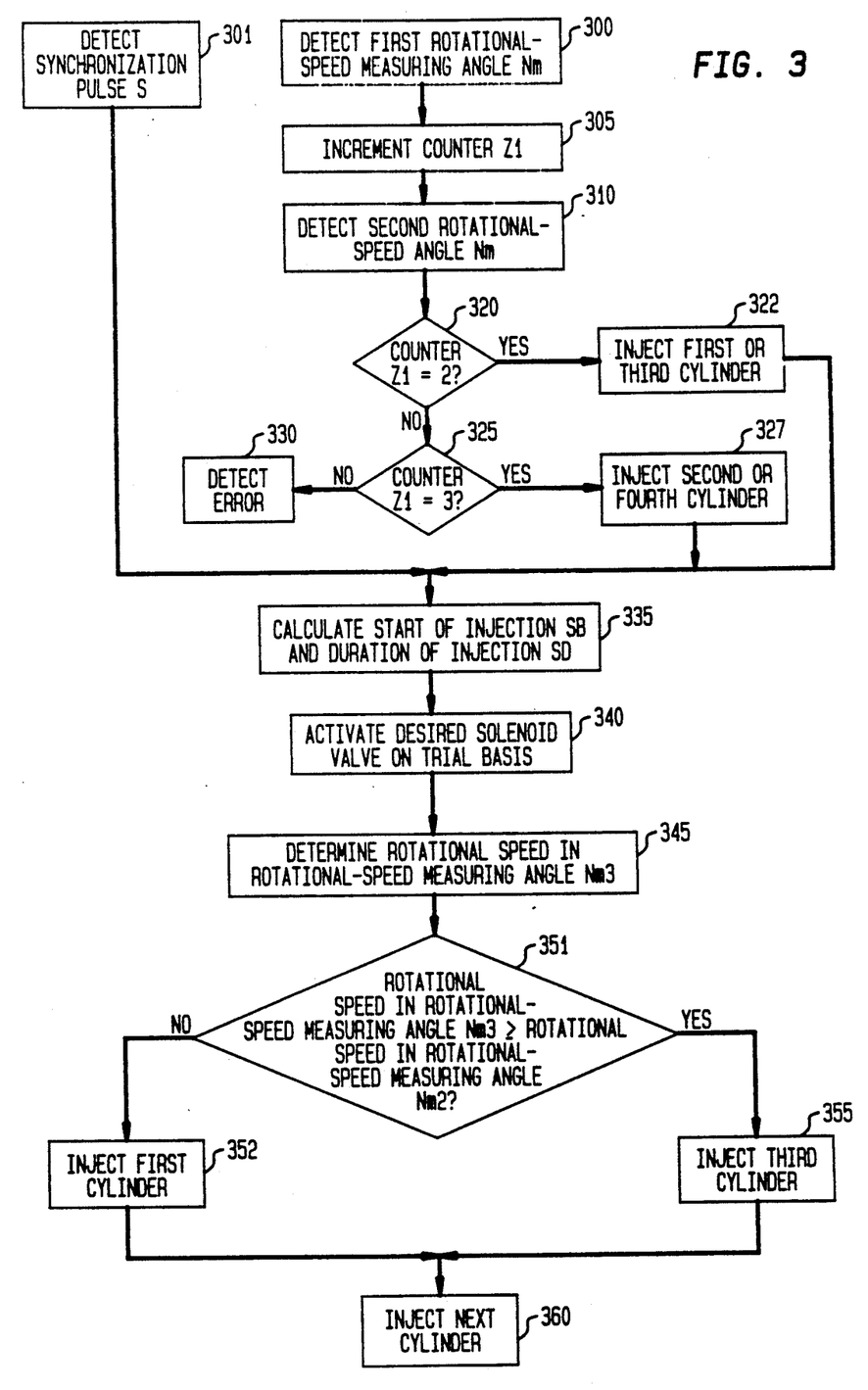
FIG. 3 shows a flow chart which illustrates the operation of the system according to the present invention.

A flow chart for the operation of the system according to the present invention is shown in FIG. 3. The synchronization mark S is detected in a first part. Various means are available for the detection. First, the synchronization pulse S can be detected in step 301 by means of a logical comparison of the pulse spacings. To accomplish this, the spacing between the pulses from the pulse transmitter on the crankshaft is evaluated. If the spacing between two successive pulses is considerably smaller than the spacing between the preceding pulses, then the last pulse is identified as the synchronization pulse S.

Since irregularities in rotational speed also affect the spacing of the pulses during acceleration or deceleration, erroneous determinations are possible here. On the other hand, in a particularly advantageous modification, the number of pulses from the pulse transmitter on the crankshaft which appear between two rotational-speed measuring angles is evaluated. The number of pulses reveals if a synchronization pulse S existed.

For this purpose, a rotational-speed measuring angle NM is detected in step 300. After the rotational-speed measuring angle NM is detected, a counter Z1 is initially set to zero and then, with each occurrence of a pulse from the pulse transmitter on the crankshaft, is incremented by 1 at 305. The counter Z1 continues to be incremented until, in step 310, the occurrence of a second rotational-speed measuring angle NM is detected.

In step 320, if it is detected that the counter has the value 2, no synchronization pulse S has occurred. This means that the second rotational-speed measuring angle detected in step 310 is the speed pulse NM3 or NM1, and further that the first or third cylinder must therefore be injected next, in step 322.

On the other hand, in step 320, if it is detected that the counter is not equal to 2, step 325 follows. In step 325, if a counter value of 3 is recognized, the existence of a synchronization pulse S is detected. Here, in the case of the second rotational-speed measuring angle detected in step 310, the rotational-speed measuring angles NM2 or NM4 are involved. This means that the next injection must take place into the second or fourth cylinder, in step 327. In step 325, if it is detected that the counter content is not equal to 3, then an error is detected in step 330. In this case, this part of the flow chart must be repeated once again.

In a second part, the injection data, i.e., the start of injection SB and the duration of injection SD, are calculated in step 335. The appropriate solenoid valve is then activated on a trial basis in step 340. This can result in injection into one of the two possible cylinders. It is then recognized whether the trial activation was correct. Such a recognition is possible because the rotational speed is evaluated. If the rotational speed, which is determined in the rotational-speed measuring angle NM3 after the activation, is considerably greater than the rotational speed which is determined with the rotational-speed measuring angle NM2 before the activation, then the trial activation was correct. Whether or not the activation was correct can be evaluated desirably by analyzing the enabling or disabling times TE, TA of the solenoid valve.

The rotational speed in the rotational-speed measuring angle NM3 is determined in step 345, and compared to the preceding rotational-speed value in the measuring angle NM2 in step 351. If the rotational speed is greater than the preceding one, then fuel injection into cylinder 3 follows in step 355. If it is smaller, then fuel injection into cylinder 1 follows in step 352. In the following step 360, subsequent injection takes place in each case into the next cylinder.

concludes the synchronization for a 4-cylinder internal-combustion engine. If no increase in rotational speed is detected, then an additional injection test must still be performed for a 6-cylinder internal-combustion engine.

It is therefore possible with this method of operation to implement the synchronization, at the latest, after one crankshaft revolution, and, on the average, even after one-half of a crankshaft revolution. Thus, the synchronization takes place within one piston stroke. It is particularly advantageous when the switching times for the solenoid valve are evaluated in addition to, or instead of, the rotational speed.

In the case of a pump-nozzle system, the camshaft actuates the pump piston directly or indirectly. In the case of a 4-cylinder internal-combustion engine, four pump-nozzle units are mounted directly on the internal combustion engine. One of the pump-nozzle units at a time delivers fuel into the internal-combustion engine. Each pump nozzle contains a delivery element. When a flow of fuel begins to be delivered via the delivery element, it is also delivered through the corresponding solenoid valve. When the solenoid valve is closed, the injection takes place into the combustion chamber. The flow of fuel delivered through the open solenoid valve into the element chamber and the pressure build-up in the case of a closed solenoid valve only take place on the solenoid valve, or on the pump-nozzle unit whose element is discharging. This means that the camshaft actuates this element, so that pressure is built-up in the element chamber. In the case of the remaining three pump-nozzle units, no flow of fuel is delivered through the element.

The enabling and the disabling times of the solenoid valve depend on whether fuel is delivered through the solenoid valve or not. Therefore, it is possible to detect the cylinder from measurement of the enabling or the disabling times. The enabling time is established by means of a BIP recognition, and the disabling time by means of a BOP or EIP recognition.

Figure 4A:
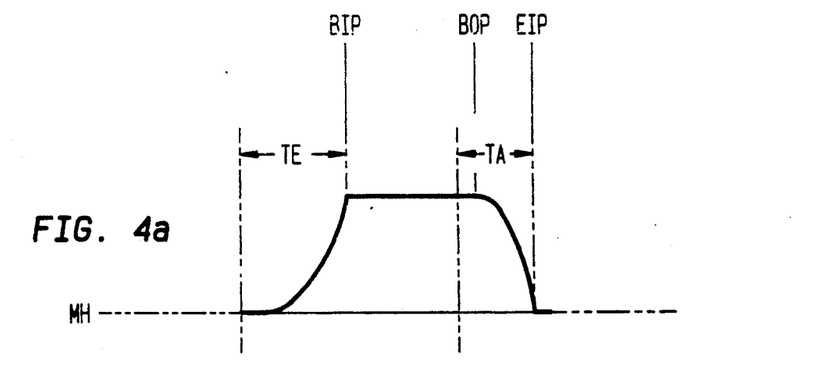
FIGS. 4a and 4b show various signals associated with the solenoid-valve.
Figure 4B:
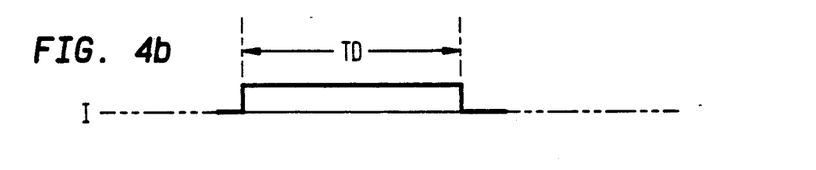

To clarify these concepts, reference is made to FIGS. 4a and 4b. In FIG. 4a, the solenoid valve lift MH is plotted as a function of time t. In FIG. 4b, the trigger pulse I of the solenoid valve is plotted as a function of time t.

BIP marks the start of the injection process. As of this instant, fuel is injected into the combustion chamber. BOP denotes the end of the injection process. At this instant, the solenoid valve begins to close, i.e., the opening cross-section of the solenoid valve is reduced in size. At the instant EIP, the solenoid valve is completely closed, and pressure is no longer built-up. The result is that injection of fuel into the combination chamber completely stops.

As shown in FIGS. 4a and 4b, there is a time difference between the switching pulse I for the solenoid valve and the beginning and the end of the injection. The time difference between the beginning of the trigger pulse and the beginning of the injection BIP is designated as the enable time TE. The time difference between the end of the trigger pulse I and the end of the injection EIP is designated as the disable time TA. The enable time TE and the disable time TA depend in each case on whether the solenoid valve works under load operation, i.e., fuel is being delivered, or under no-load operation, i.e., no fuel is being delivered.

The synchronization, i.e., the allocation of the cylinder counter to the cylinder to be injected, takes place as follows. At start-up, the individual solenoid valves of the various pump-nozzle units are quickly triggered in a cyclical manner, i.e., opening and immediately closing again, by cylinder 1 through cylinder N.

The opening and closing preferably takes place in a time interval of about 1.5 milliseconds. During the short opening time of the solenoid valve, provided that a pump element is in its prestroke, only a quantity of fuel that is negligible compared to the beginning quantity is injected. The enabling times TE and/or the disabling times TA are determined during the trial activation of the solenoid valves. On the basis of the measured switching times, it can be established which of the pump-nozzle elements is delivering. From this value, the cylinder counter can be started with the correct value.

Figure 5:
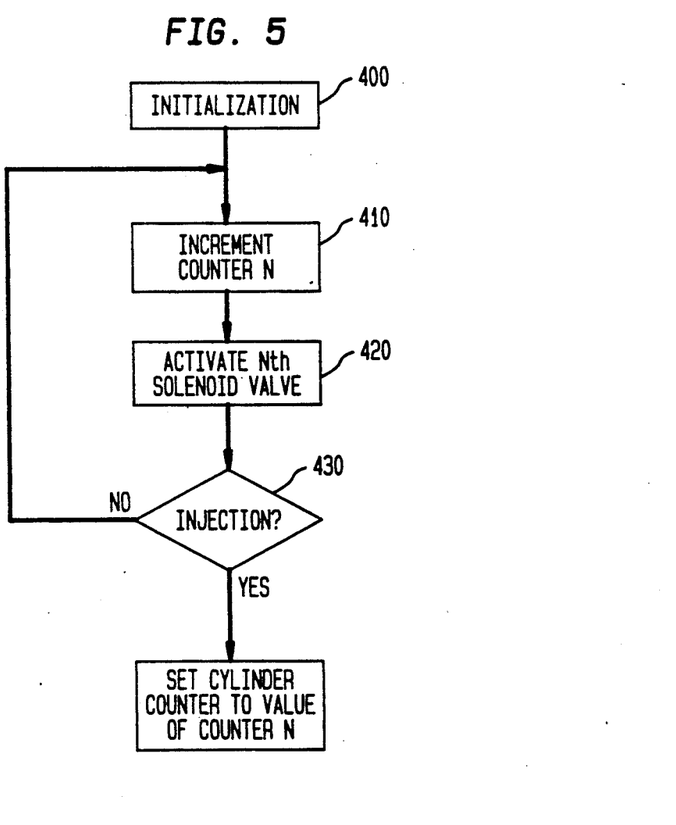
FIG. 5 shows a flow chart which illustrates the operation of a modified system according to the present invention.

This process proceeds as depicted in the flow chart of FIG. 5. An initialization takes place in step 400. Thus, for example, a counter N is set to zero. In step 410, the counter N is incremented by 1. In step 420, the Nth solenoid valve is activated.

The enabling time TE and/or the disabling time TA are then evaluated in step 430. Meanwhile, if the realization is that no injection is taking place, then the counter N is again incremented by 1 in step 410. However, if the realization is that a delivery of fuel follows, then the cylinder counter is set to the value of the counter N in step 440. This ends the synchronization procedure.

As a result of this procedure, synchronization is possible for the injection test with the first revolution of the motor. Furthermore, the advantage of this procedure compared to the process of injecting fuel on a trial basis and of evaluating the change in rotational speed is that the start-up fuel quantity is not injected incorrectly and, therefore, there is no emission of black smoke. The transmitter systems, or the evaluation principles applied in pump-nozzle systems, can be used for the cylinder synchronization. Therefore, no additional sensors are necessary.

In the case of a cold start, a faulty interpretation of the measuring results is possible due to variable cylinder friction or incomplete combustion. Therefore, it is necessary to wait until the synchronization has been additionally safeguarded. This is done with the help of a temperature threshold, and proceeds as follows. If the temperature lies under a specified threshold, then the process is repeated one time after the above-described flow chart has been traversed once. The two results are compared. In the case of a cold motor, this longer start-up process is of no consequence.

If the goal is to achieve the highest possible reliability of the system to protect against failure, then, in addition, the synchronization pulse must be detected redundantly. This can be accomplished, for example, by placing an additional synchronization mark on the camshaft. This redundancy enables operation under emergency conditions, in that even a motor that is not running can be started again, so that the motor vehicle can be driven to a service station. If no such second transmitter is available, the motor can continue to run when the transmitter fails, but a renewed start is not possible.

If individual interference pulses occur, then a monitoring operation must follow in which the synchronization pulse detected with the described process is compared to the cyclically rotating cylinder counter. With the help of a logic circuit, a redundant cylinder counter, and the described procedure, individual interference pulses are rendered ineffective. If the interference cannot be removed by means of the logic circuit, as long as the motor still turns, an emergency program must assure a new synchronization, as during start-up.

Figure 6A:
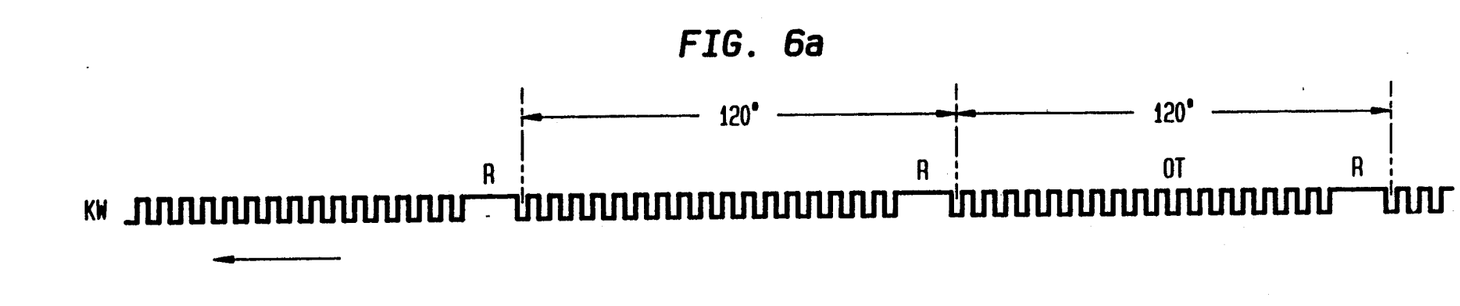
FIGS. 6a and 6b show various signal sequences of a system according to the present invention.

A particularly advantageous embodiment of a system according to the present invention provides for the mounting of the pulse wheels in reverse. This means that a pulse wheel that produces an incremental raster is located on the crankshaft. Such a pulse wheel emits a pulse sequence as shown in FIG. 6a. In the case of a six-cylinder internal-combustion engine, a pulse is missing at a spacing of 120 degrees, and therefore a reference pulse R is defined. This reference pulse R is usually used to determine the start of injection. Furthermore, the top dead center OT of the piston is drawn. The direction of rotation of the shaft is indicated by an arrow.

Figure 6B:
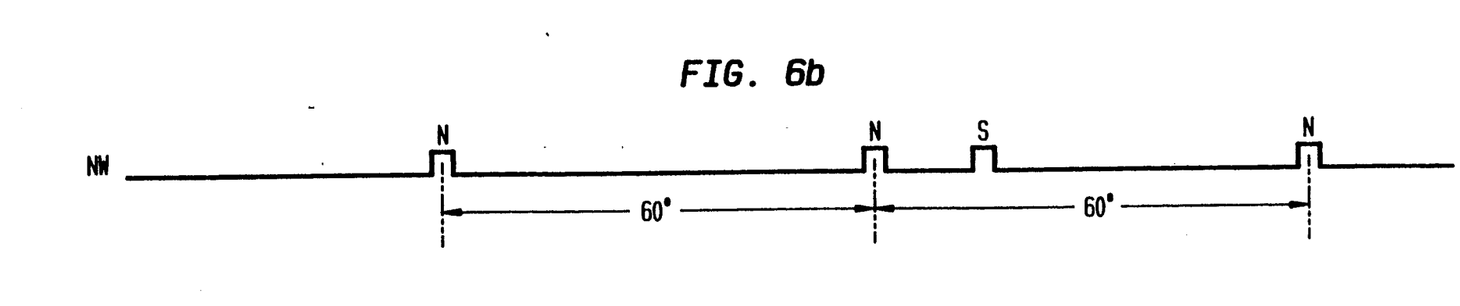

Located on the camshaft is a transmitter wheel which emits at least one synchronization pulse S as well as the speed pulses N. The signal sequence generated by this transmitter wheel is shown in FIG. 6b. In the case of a six-cylinder internal-combustion engine, the speed pulses occur with a spacing of 60 degrees. The synchronization mark S is usually used for synchronization.

It is even possible for both pulse wheels to be placed on the same shaft, or for only one pulse wheel be to provided and for a corresponding evaluation circuit to separate the individual pulse sequences. In such systems, the synchronization usually occurs by evaluating the speed pulses N, the synchronization pulse S, and perhaps other signals. In such systems, the procedure according to the present invention is particularly advantageous under emergency conditions. This type of emergency operation is necessary when the pulse transmitter and/or the associated evaluation unit, which generate the synchronization pulses or implement the synchronization, fail.

The procedure is particularly suited as an emergency procedure in those systems in which the synchronization is performed for the most part on the basis of the evaluation of reference pulses and/or synchronization pulses. In such systems, the fuel quantity is usually released only when the synchronization has taken place.

Figure 7:
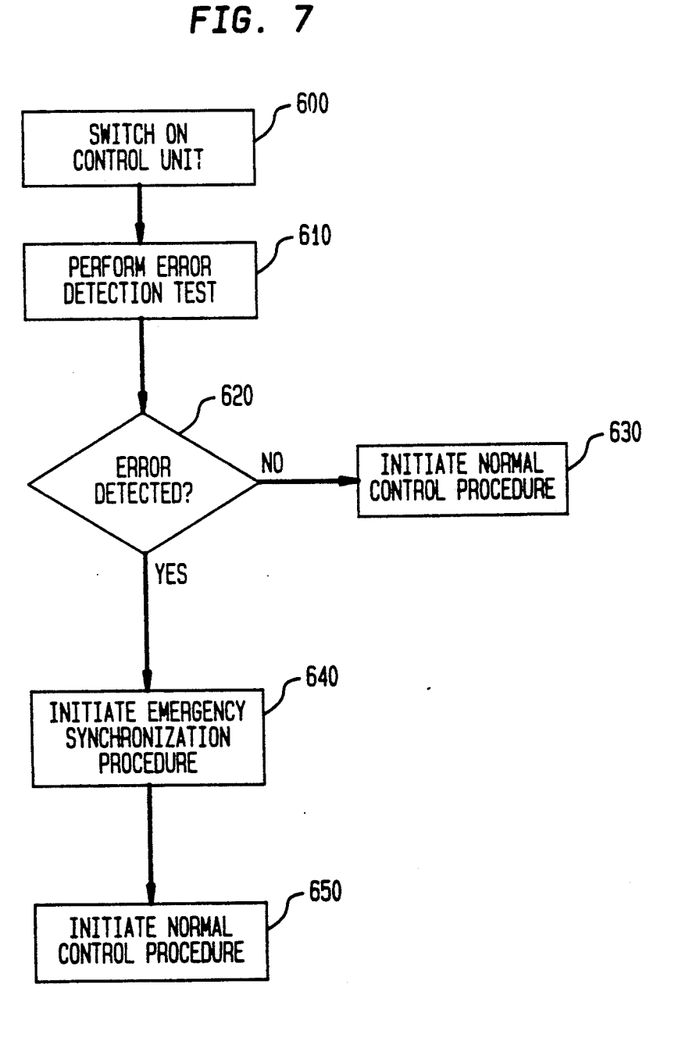
FIG. 7 shows a flow chart which illustrates the operation of a system according to the present invention, under emergency conditions.

The procedure, which is clarified in FIG. 7, serves to maintain emergency driving operation when synchronization fails. After the control unit is switched on in step 600, a known error detection test is performed in step 610.

This test detects if the synchronization can be or has been properly implemented. This is not the case, for example, when the sensors and the evaluation unit are defective. If it is detected in step 620 that the synchronization can be or has been properly implemented, then the normal procedure for controlling the internal-combustion engine follows in step 630. If it is detected, on the other hand, that the synchronization is faulty or is not possible, then an emergency synchronization is initiated in step 640. The normal control procedure then follows in step 650.

Such an emergency synchronization can be performed as described in the preceding paragraphs, for example. The emergency synchronization is merely supposed to ensure that the internal-combustion engine can be started and that it is working well-enough to perform at least a limited range of functions. Fast synchronization is not required in an emergency operation. Moreover, in an emergency operation, unacceptably high exhaust emissions are not a concern. Since the requirements for emergency operation are not as stringent as those for normal operation, a considerably simpler procedure can be applied.

Figure 8A:
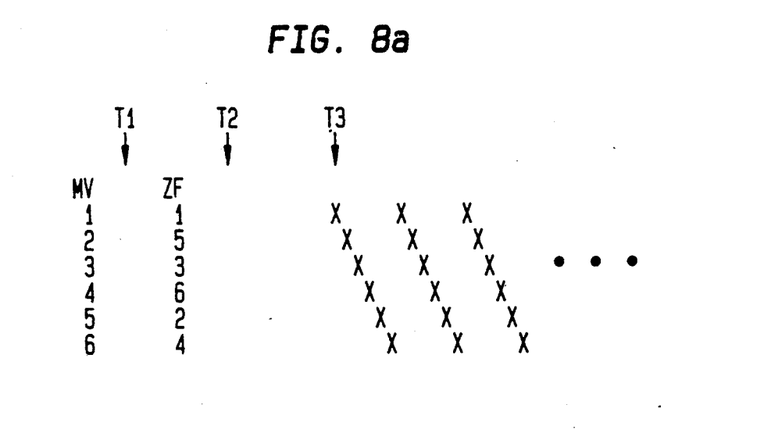
FIGS. 8a, 8b, and 8c show various sequences for activating the solenoid valves.
Figure 8B:
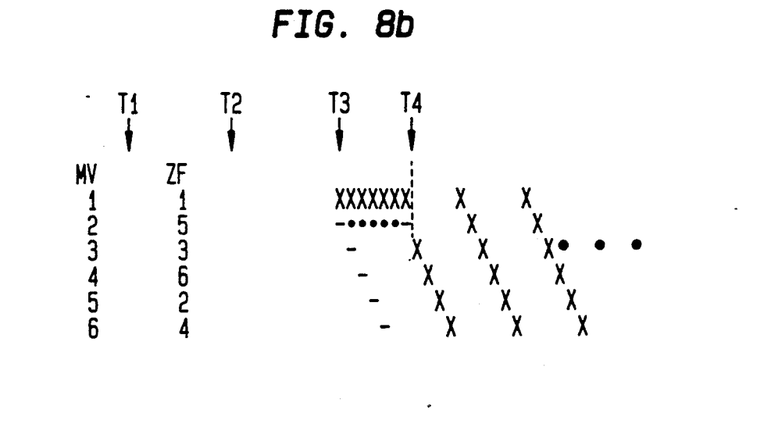
Figure 8C:
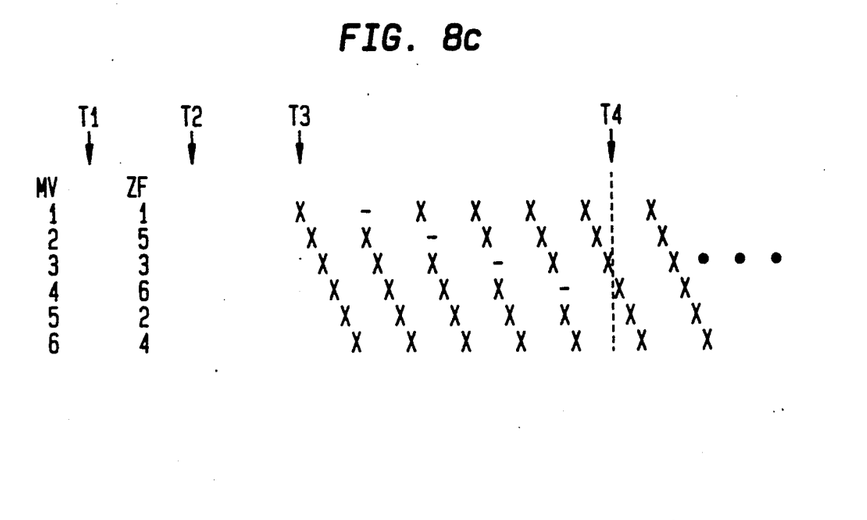

The procedure is clarified in FIG. 8, in which various sequences for activating the solenoid valves are plotted as a function of time. The correct firing order ZF of the individual cylinders is also plotted, as an example.

The control unit is switched on at instant T1. The synchronization is usually performed between instant T1 and instant T2. If it is detected in this time interval that the synchronization cannot be performed, or that the synchronization is faulty, the switch-over is made to emergency operation. At instant T3, the injection process is started. Instances of activation that have been carried out are shown with an X and those that have been left out are shown with a dash. The sequence for activating the individual solenoid valves MV is shown in FIG. 8a in accordance with a correctly implemented synchronization.

In FIGS. 8b and 8c, the sequence of activation is shown for a faulty synchronization or for a failure of the pulse transmitter on the camshaft/crankshaft. In the procedure clarified in FIG. 8b, initially only the solenoid valve allocated to the first cylinder is activated for each ongoing injection operation.

The activation of the solenoid valve leads only to an injection when the pump piston allocated to the first cylinder begins to deliver fuel. Therefore, the combustion chamber of the internal-combustion engine is injected only when the pump piston allocated to the first cylinder delivers fuel.

An injection follows, at the latest, two revolutions of the crankshaft after the error is determined. This leads at instant T4 to a marked increase in rotational speed. This increase in rotational speed is detected, as already described. It is also particularly advantageous when a larger angular range is evaluated as the measuring angle to determine the instantaneous rotational speed. The average rotational speed spacing between two speed pulses N can also be used to detect the increase in rotational speed.

The synchronization is complete when it is established by evaluating the increase in rotational speed that fuel has been injected into the first cylinder. The solenoid valves allocated to the remaining cylinders are subsequently activated in accordance with the established firing order. An injection is skipped
increase in rotational speed is detected only after a certain time delay.

Even if synchronization fails, this procedure enables a rapid synchronization (maximally after two crankshaft revolutions) by means of the synchronization pulse S.

The sequence for activating the individual solenoid valves is shown in FIG. 8c as another version of the method according to the present invention. The solenoid valves are initially continuously activated in accordance with the established firing order. If no synchronization has taken place yet, i.e., injection did not begin with the correct cylinder, then no marked increase in rotational speed results. After one machine cycle, i.e., after all solenoid valves have been activated once (this corresponds to two revolutions of the crankshaft), one solenoid valve is skipped and is not activated in the next machine cycle.

In other words, after the first machine cycle, injection does not begin with the first but rather with the second solenoid valve. The solenoid valves are subsequently activated again in accordance with the established firing order. This procedure is repeated, whereby, one after the other, another solenoid valve is skipped in each case and is not activated, until one solenoid valve is activated synchronization with the delivering stroke. This leads to injections and thus at instant T4 to an increase in rotational speed. On the basis of the increase in rotational speed, it is recognized that the correct solenoid valve was activated. Thus further injection can be started based on the above synchronization.

Since, according to this procedure, an increase in rotational speed occurs because all cylinders are injected, the increase is substantially greater than in the first version, in which there was only one injection into one cylinder. This greater increase in rotational speed can be detected more easily and reliably.

What is claimed is:

1. A control system for a fuel pump for an internal-combustion engine, the engine having a crankshaft, a camshaft, a plurality of cylinders, and a plurality of solenoid valves, comprising:
    at least one pulse transmitter mounted on the crankshaft or camshaft for generating a plurality of pulses which include at least one reference pulse establishing the beginning of fuel injection into the individual cylinders of the engine, the pulses being used to detect rotational speed;
    a controlling device for determining the quantity of fuel to be injected based on the pulses received from the pulse transmitter;
    means for activating the controlling device to inject fuel into a predetermined cylinder of the engine and to synchronize fuel injection; and
    means for detecting whether fuel was injected into a proper cylinder based upon a reaction of the engine to the injection of fuel.

2. The control system as recited in claim 1, wherein the detecting means evaluates rotational speed signals and switching times of the solenoid valve.

3. The control system as recited in claim 1, wherein the pulses generated by the pulse transmitter further include a synchronization pulse, and the particular cylinder to be injected is based on the synchronization pulse.

4. The control system as recited in claim 1, wherein the detecting means determines whether fuel was injected into the proper cylinder when a first rotational speed detected in a first rotational-speed measuring angle before actuation of the controlling device is less than a second rotational speed detected in a second rotational-speed measuring angle after actuation of the controlling device.

5. The control system as recited in claim 2, wherein the solenoid valves are consecutively actuated, and based on a plurality of different enabling times and a plurality of different disabling times, the next cylinder to be injected with fuel is determined.

6. The control system as recited in claim 3, wherein the synchronization pulse is detected by comparing the spacings between the pulses from the pulse transmitter on the crankshaft.

7. The control system as recited in claim 3, wherein the synchronization pulse is detected by evaluating the number of pulses from the pulse transmitter on the crankshaft between two consecutive rotational-speed measuring angles.

8. The control system according to claim 7, wherein the existence of the synchronization pulse is recognized when three pulses occur.

9. The control system according to claim 6, wherein an error is recognized when no pulses occur or when more than three pulses occur.

10. The control system according to claim 1, wherein synchronization of fuel injection is repeated when a temperature is less than a temperature threshold.

11. The control system according to claim 1, wherein fuel injection is synchronized in an emergency operation of the engine.

12. The control system according to claim 11, wherein a solenoid valve associated with a predetermined cylinder is continuously activated until fuel injection is detected based on a rotational-speed signal.

13. The control system according to claim 11, wherein the solenoid valves are activated based on a predetermined firing order until a fuel injection is detected based on a rotational-speed signal, and after two crankshaft revolutions, an actuation of a solenoid valve is skipped.

14. The control system according to claim 11, wherein the solenoid valves are activated based on a predetermined firing order, after a fuel injection is detected.

15. A method for controlling an injection of fuel from a fuel pump to a plurality of cylinders of an internal-combustion engine, comprising the steps of:
    generating a plurality of pulses which includes a reference pulse establishing the beginning of the injection of fuel;
    determining the quantity of fuel to be injected based on the pulses;
    injecting fuel into a predetermined cylinder of the engine for synchronizing fuel injection; and
    detecting whether fuel was injected into a proper cylinder based upon a reaction of the engine to the injection of fuel.

* * * * *

UNITED STATES PATENT AND TRADEMARK OFFICE
CERTIFICATE OF CORRECTION

PATENT NO. : 5,188,081

DATED : February 23, 1993

INVENTOR(S) : Birk et al.

It is certified that error appears in the above-identified patent and that said Letters Patent is hereby corrected as shown below:

Column 5, line 12, change "concludes" to --This concludes--

Column 8, line 58, change "skipped" to --skipped because the--.

Signed and Sealed this

Twenty-ninth Day of March, 1994

Attest:

BRUCE LEHMAN

Attesting Officer

Commissioner of Patents and Trademarks